R. H. CLAPP.
REINFORCING MEANS FOR ANGLE COCKS.
APPLICATION FILED OCT. 31, 1918.
1,309,395.
Patented July 8, 1919.
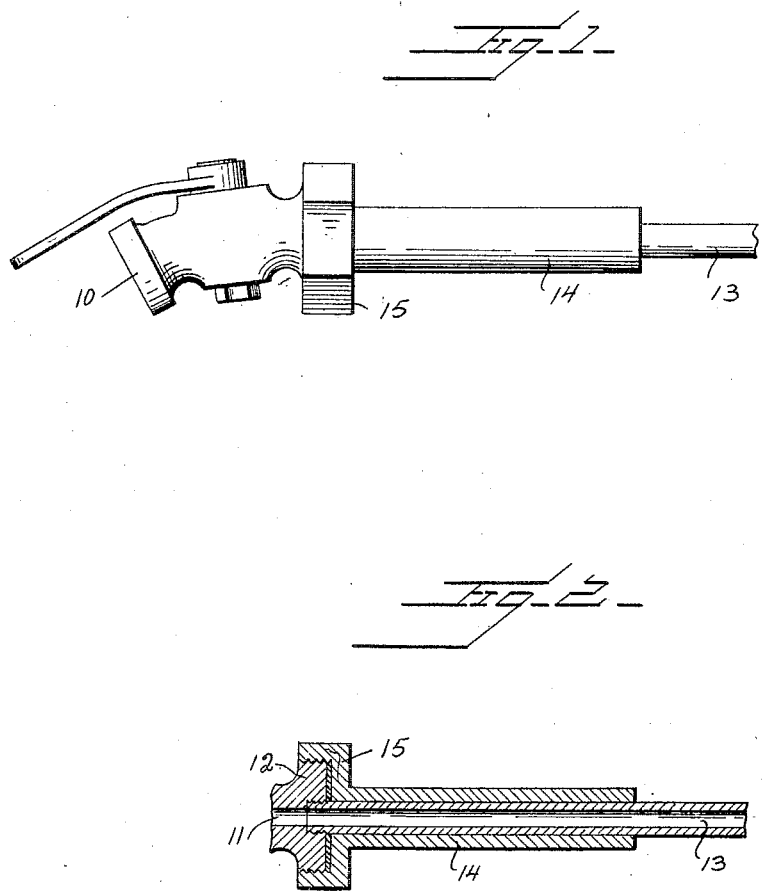
Inventor
Roger H. Clapp
By Watson E. Coleman
Attorney

UNITED STATES PATENT OFFICE.

ROGER H. CLAPP, OF PHILADELPHIA, PENNSYLVANIA.

REINFORCING MEANS FOR ANGLE-COCKS.

1,309,395.

Specification of Letters Patent.

Patented July 8, 1919.

Application filed October 31, 1918. Serial No. 260,462.

*To all whom it may concern:*

Be it known that I, ROGER H. CLAPP, a citizen of the United States, residing at Philadelphia, in the county of Philadelphia and State of Pennsylvania, have invented certain new and useful Improvements in Reinforcing Means for Angle-Cocks, of which the following is a specification, reference being had to the accompanying drawings.

This invention relates to angle cocks, such as are used in air brake systems, and the general object is to provide means for reinforcing the joint between the train line and the angle cock.

In air brake systems the train line, which is made of 1¼″ pipe has screw-threaded engagement with one end of the angle cock, this train line pipe being supported by means of a pipe hanger. The joint, however, between the train line and the angle cock is very liable to break and the object of my invention is to provide means for reinforcing and supporting the train line pipe at its junction with the angle cock so as to reduce or prevent this breakage.

A further object is to provide a very simple means for this purpose which may be readily applied and readily removed and which will permit the easy disconnection of the train line from the angle cock, when desired.

Other objects will appear in the course of the following description.

My invention is illustrated in the accompanying drawings, wherein:—

Figure 1 is a side elevation of my reinforcing device applied to an angle cock; and Fig. 2 is a longitudinal section of a part of the angle cock and train pipe line and my reinforcing device in applied position.

Referring to these drawings, 10 designates an angle cock of the usual form which is provided with a central bore 11, the wall of this bore being screw-threaded at one extremity of the cock. This extremity of the cock is formed with a relatively large head 12, so as to provide a thickened wall and the circumferential face of this wall is screw-threaded. The train line pipe 13 is exteriorly screw-threaded at one end for engagement with the threaded bore 11.

For the purpose of reinforcing the joint between the pipe 13 and the angle cock I provide a sleeve 14 which has an interior diameter equal to the exterior diameter of the train line pipe 13 and which at one end is formed with the interiorly screw-threaded head 15, the screw-threads of which engage with the exterior threads of the head 12 so that the head 15 fits over the head 12. Thus the sleeve may be drawn up tightly against the head 12 and in this position the sleeve will support and reinforce the train line pipe 13 and will take strain off the threads of said pipe so as to prevent breaking the thread or breaking the pipe 13 at its point of connection with the head 12.

It will be understood that the angle cock may be of any suitable or usual construction and is provided with the usual valve for controlling passage through the bore 11. It is also to be understood that the sleeve 14 may be so formed as to accommodate the ordinary bushing which is commonly used between the train line pipe 13 and the head 12 of the valve. The exterior of the head 15 is preferably made many-sided so as to permit the application of a wrench thereto whereby the head and sleeve may be removed. It is obvious that I do not wish to be limited to any details of construction as these details may be varied in many ways and that I do not wish to be limited to the application of my invention to an angle cock as it may be used in other situations.

I claim:—

1. The combination with an angle cock having a central bore screw-threaded at one end, the wall of the bore at the screw-threaded end having exterior screw-threads, and a train line pipe having screw-threaded engagement with said bore, of a reinforcing sleeve surrounding and fitting the train line pipe and having an interiorly screw-threaded enlarged head at one end embracing the head on the pipe fitting and having screw-threaded engagement therewith.

2. As an article of manufacture a sleeve for reinforcing the junction between a train line pipe and an angle cock having screw-threaded engagement therewith, the sleeve having an interior bore to receive and fit the train line pipe and having at one end an enlarged hollow head having interior screw-threads to engage with the angle cock.

In testimony whereof I hereunto affix my signature in the presence of two witnesses.

ROGER H. CLAPP.

Witnesses:
 JNO. COOK MOOLLNEN,
 IRVING EYER.

Copies of this patent may be obtained for five cents each, by addressing the "Commissioner of Patents, Washington, D. C."